United States Patent
Adib et al.

(10) Patent No.: US 10,343,117 B2
(45) Date of Patent: Jul. 9, 2019

(54) CERIA-ZIRCONIA-ZEOLITE CATALYST BODY

(75) Inventors: Kaveh Adib, Corning, NY (US); Jacqueline Leslie Brown, Lindley, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 471 days.

(21) Appl. No.: 12/395,160

(22) Filed: Feb. 27, 2009

(65) Prior Publication Data

US 2010/0221160 A1    Sep. 2, 2010

(51) Int. Cl.

| | |
|---|---|
| *B01D 53/94* | (2006.01) |
| *B01J 29/06* | (2006.01) |
| *B29C 47/00* | (2006.01) |
| *B01J 29/14* | (2006.01) |
| *B01J 29/24* | (2006.01) |

(Continued)

(52) U.S. Cl.
CPC ........ *B01D 53/9418* (2013.01); *B01J 29/061* (2013.01); *B01J 29/14* (2013.01); *B01J 29/24* (2013.01); *B01J 29/46* (2013.01); *B01J 29/7615* (2013.01); *B01J 29/84* (2013.01); *B01J 35/04* (2013.01); *B01J 37/0009* (2013.01); *B01J 37/0018* (2013.01); *C04B 35/488* (2013.01); *C04B 38/0006* (2013.01); *B01D 2255/20738* (2013.01); *B01D 2255/407* (2013.01); *B01D 2255/504* (2013.01); *B01D 2255/65* (2013.01); *B01J 23/10* (2013.01); *B01J 37/04* (2013.01); *C04B 2111/0081* (2013.01); *C04B 2111/00793* (2013.01); *C04B 2235/3229* (2013.01); *C04B 2235/3244* (2013.01); *C04B 2235/3472* (2013.01)

(58) Field of Classification Search
CPC ...... B01D 53/9418; B01D 2255/20738; B01D 2255/407; B01D 2255/504; B01D 2255/65; B01J 23/10; B01J 29/14; B01J 29/24; B01J 29/46; B01J 29/7615; B01J 29/84; C04B 35/488; C04B 38/0006; C04B 38/0054; C04B 38/0074
See application file for complete search history.

(56) References Cited

U.S. PATENT DOCUMENTS

| 3,140,253 A | 7/1964 | Plank et al. |
|---|---|---|
| 3,392,107 A | 7/1968 | Pfefferle |

(Continued)

FOREIGN PATENT DOCUMENTS

| EP | 922485 | 6/1999 |
|---|---|---|
| EP | 1415956 | 5/2004 |

(Continued)

OTHER PUBLICATIONS

Wusirika et al, "Extruded Zeolite Catalysts for Lean Exhaust Application", SAE International, 2005-1-1118.*

(Continued)

*Primary Examiner* — Jun Li

(57) ABSTRACT

A catalyst body which includes ceria:zirconia and a metal-zeolite, and is substantially free, or free, of tungsten or tungsten compounds, and methods of manufacture. The ceria and zirconia are present with a zirconia/ceria mole ratio of less than or equal to 1.0. The catalyst body is especially useful in NOx reduction applications.

24 Claims, 3 Drawing Sheets

(51) Int. Cl.
*B01J 29/46* (2006.01)
*B01J 29/76* (2006.01)
*B01J 29/84* (2006.01)
*B01J 35/04* (2006.01)
*B01J 37/00* (2006.01)
*C04B 35/488* (2006.01)
*C04B 38/00* (2006.01)
*B01J 23/10* (2006.01)
*B01J 37/04* (2006.01)
*C04B 111/00* (2006.01)

(56) References Cited

U.S. PATENT DOCUMENTS

| | | | |
|---|---|---|---|
| 3,406,123 A | | 10/1968 | Sensel et al. |
| 5,520,895 A | | 5/1996 | Sharma et al. |
| 5,552,128 A | | 9/1996 | Chang et al. |
| 5,676,912 A | | 10/1997 | Sharma et al. |
| 5,733,837 A | * | 3/1998 | Nakatsuji et al. ............ 502/304 |
| 5,863,508 A | | 1/1999 | Lachman et al. |
| 6,040,265 A | | 3/2000 | Nunan |
| 6,413,898 B1 | | 7/2002 | Faber et al. |
| 6,780,805 B2 | | 8/2004 | Faber et al. |
| 7,566,424 B2 | * | 7/2009 | Miyoshi et al. ............ 422/180 |
| 7,851,396 B2 | * | 12/2010 | Ohno et al. ................... 502/178 |
| 8,372,366 B2 | | 2/2013 | Sato et al. |
| 8,425,869 B2 | | 4/2013 | Sato et al. |
| 2003/0073566 A1 | * | 4/2003 | Marshall et al. ............... 502/64 |
| 2003/0129124 A1 | * | 7/2003 | Guttridge et al. ............ 423/600 |
| 2004/0176246 A1 | * | 9/2004 | Shirk et al. ................... 502/439 |
| 2005/0124486 A1 | * | 6/2005 | Tran et al. ...................... 502/66 |
| 2007/0110650 A1 | * | 5/2007 | Pfeifer ............... B01D 53/9418 423/213.5 |
| 2008/0119355 A1 | * | 5/2008 | Ohno et al. ................... 502/340 |
| 2008/0279738 A1 | | 11/2008 | Strehlau et al. |
| 2008/0287283 A1 | * | 11/2008 | Tepesch ............. B01D 53/9418 502/62 |
| 2009/0143221 A1 | * | 6/2009 | Ogunwumi .......... B01D 53/944 502/67 |
| 2009/0260349 A1 | * | 10/2009 | Gandhi et al. .................. 60/286 |
| 2009/0291833 A1 | * | 11/2009 | Ohno ................. B01D 53/9418 502/65 |
| 2009/0291839 A1 | * | 11/2009 | Kunieda ............ B01D 46/2429 502/74 |
| 2010/0166628 A1 | * | 7/2010 | Soeger ............... B01D 53/9418 423/213.5 |
| 2010/0298131 A1 | | 11/2010 | Ni et al. |

FOREIGN PATENT DOCUMENTS

| | | | |
|---|---|---|---|
| JP | 4363143 A | | 12/1992 |
| JP | 10128123 A | | 5/1998 |
| JP | 10174878 | * | 6/1998 |
| JP | 12174878 | * | 6/1998 |
| JP | 1999226414 | | 8/1999 |
| JP | 2006326437 A | | 12/2006 |
| WO | 2004/022229 | | 3/2004 |
| WO | 2006026067 A1 | | 3/2006 |
| WO | 2006109849 A1 | | 10/2006 |
| WO | WO 2007137675 A1 | * | 12/2007 ......... B01D 53/9418 |
| WO | 2008150462 A2 | | 12/2008 |

OTHER PUBLICATIONS

Wusirika et al.; "Extruded Zeolite Catalysts for Lean Exhaust Application"; SAE Technical Paper Series; Document No. 2005-01-1118; Apr. 2005.

Rohart et al.; "High OSC $CeO_2/ZrO_2$ Mixed Oxides Used as Preferred Metal Carriers for Advanced Catalysts"; SAE Technical Paper Series; Document No. 2007-01-1057; Apr. 2007.

JP1999226414—machine translation.

J. I. Gutiérrez-Ortiz et al., Characterisation of the Catalytic Properties of Ceria-Zirconia Mixed Oxides by Temperatureprogrammed Techniques, Journal of Thermal Analysis and Calorimetry, vol. 80 (2005) 225-228.

Y. Nagai et al., Structure Analysis of $CeO_2$—$ZrO_2$ Mixed Oxides as Oxygen Storage Promoters in Automotive Catalysts, Special Issue "Oxygen Storage Materials for Automotive Catalysts—Ceria-Zirconia Solid Solutions", R&D Review of Toyota CRDL, vol. 37. No. 4, (2002).

* cited by examiner

CERIA-ZIRCONIA-ZEOLITE CATALYST BODY

FIELD

The present invention relates generally to catalysts and catalyst bodies, such as extruded honeycomb catalyst bodies, such as for use in engine exhaust systems.

BACKGROUND

Various methods and devices are known for reducing emissions of engine exhaust, including catalyst supports or substrates.

SUMMARY

The present disclosure relates to catalysts and catalyst bodies, for example extruded honeycomb catalyst bodies, such as for use in engine exhaust systems, and their manufacture.

In one aspect, the present disclosure relates to a $NO_x$ reducing catalyst body comprised of ceria, zirconia, and a metal exchanged or impregnated zeolite, such as iron exchanged or impregnated zeolite, or copper exchanged or impregnated zeolite, wherein the catalyst body contains essentially no tungsten, and wherein the ceria and zirconia are present with a zirconia/ceria mole ratio of less than or equal to 1.0. In some embodiments, the ceria and zirconia are present with a zirconia/ceria mole ratio of less than or equal to 0.9. In some embodiments, the ceria and zirconia are present with a zirconia/ceria mole ratio of less than or equal to 0.8. In some embodiments, the ceria and zirconia are present with a zirconia/ceria mole ratio of 0.7 to 1.0. Preferably, the catalyst body is substantially free, or free, of tungsten oxides and vanadium oxides. In some embodiments, the catalyst body further comprises iron; in some of these embodiments, the zeolite contains iron. In some embodiments, the catalyst body comprises greater than or equal to 50 wt % zeolite. In some embodiments, the catalyst body comprises 60 to 80 wt % zeolite. In some embodiments, the catalyst body comprises less than or equal to 50 wt % Ce:Zr. In some embodiments, the catalyst body comprises 20 to 40 wt % Ce:Zr. In some embodiments, the catalyst body comprises 60 to 80 wt % zeolite and 20 to 40 wt % Ce:Zr.

In some embodiments, the catalyst body reduces $NO_x$ gas by at least 20% at all temperatures from 150° C. to 600° C. In some embodiments, the catalyst body reduces $NO_x$ gas by at least 30% at all temperatures from 200° C. to 600° C. In some embodiments, the catalyst body reduces $NO_x$ gas by at least 40% at all temperatures from 200° C. to 600° C. In some embodiments, the catalyst body reduces $NO_x$ gas by at least 50% at all temperatures from 200° C. to 600° C. In some embodiments, the catalyst body reduces $NO_x$ gas by at least 60% at all temperatures from 200° C. to 600° C.

In some embodiments, the metal exchanged or impregnated zeolite is selected from the group consisting of ZSM-5, beta-zeolites, mordenite, Y-zeolites, ultrastabilized Y-zeolites, aluminum phosphate zeolites, and mixtures thereof.

In some embodiments, the body is substantially free, or free, of platinum, palladium, and rhodium.

In some embodiments, the body has a plurality of walls defining a plurality of parallel channels. In some embodiments, at least part of the body is honeycomb shaped. Preferably, the walls of the body are formed from extrusion of the mixture.

In another aspect, the present disclosure relates to the use of the catalyst body disclosed herein, the use comprising contacting an engine exhaust stream containing $NO_x$ gas. In some embodiments, the temperature of the exhaust stream is less than 200° C. and the $NO_x$ gas is catalytically reduced by contact with the catalyst body.

In another aspect, the present disclosure relates to a catalyst body consisting essentially of ceria, zirconia, and a zeolite, wherein the ceria and zirconia are present with a zirconia/ceria mole ratio of less than or equal to 1.0, wherein the catalyst body is capable of reducing $NO_x$ gas by at least 30% at $NO_x$ gas temperatures of 200° C. to 600° C. In some embodiments, the catalyst body contains no tungsten, vanadium, platinum, palladium, or rhodium.

In another aspect, the present disclosure relates to a method of manufacturing a catalyst body comprising: extruding a mixture of an inorganic binder and oxide-based components into a shaped body, the oxide-based components being comprised of zeolite and $CeO_2$—$ZrO_2$, with a Zr/Ce mole ratio of less than or equal to 1.0, the mixture being substantially free, or free, of W; then firing the shaped body at a furnace temperature of at least 450° C. for at least 2 hours.

Additional features and advantages of the present disclosure will be set forth in the detailed description which follows, and will be readily apparent to those skilled in the art from that description or recognized by practicing the subject matter as described herein, including the detailed description which follows, the claims, as well as the appended drawings.

It is to be understood that both the foregoing general description and the following detailed description are intended to provide an overview or framework for understanding the nature and character of the inventions as claimed. The accompanying drawings and figures are included to provide a further understanding of the disclosure, and are incorporated into and constitute a part of the specification. The figures illustrate various embodiments and aspects of the disclosure, and together with the description serve to explain the principles and operations of the claimed invention.

DETAILED DESCRIPTION

Figure 1:
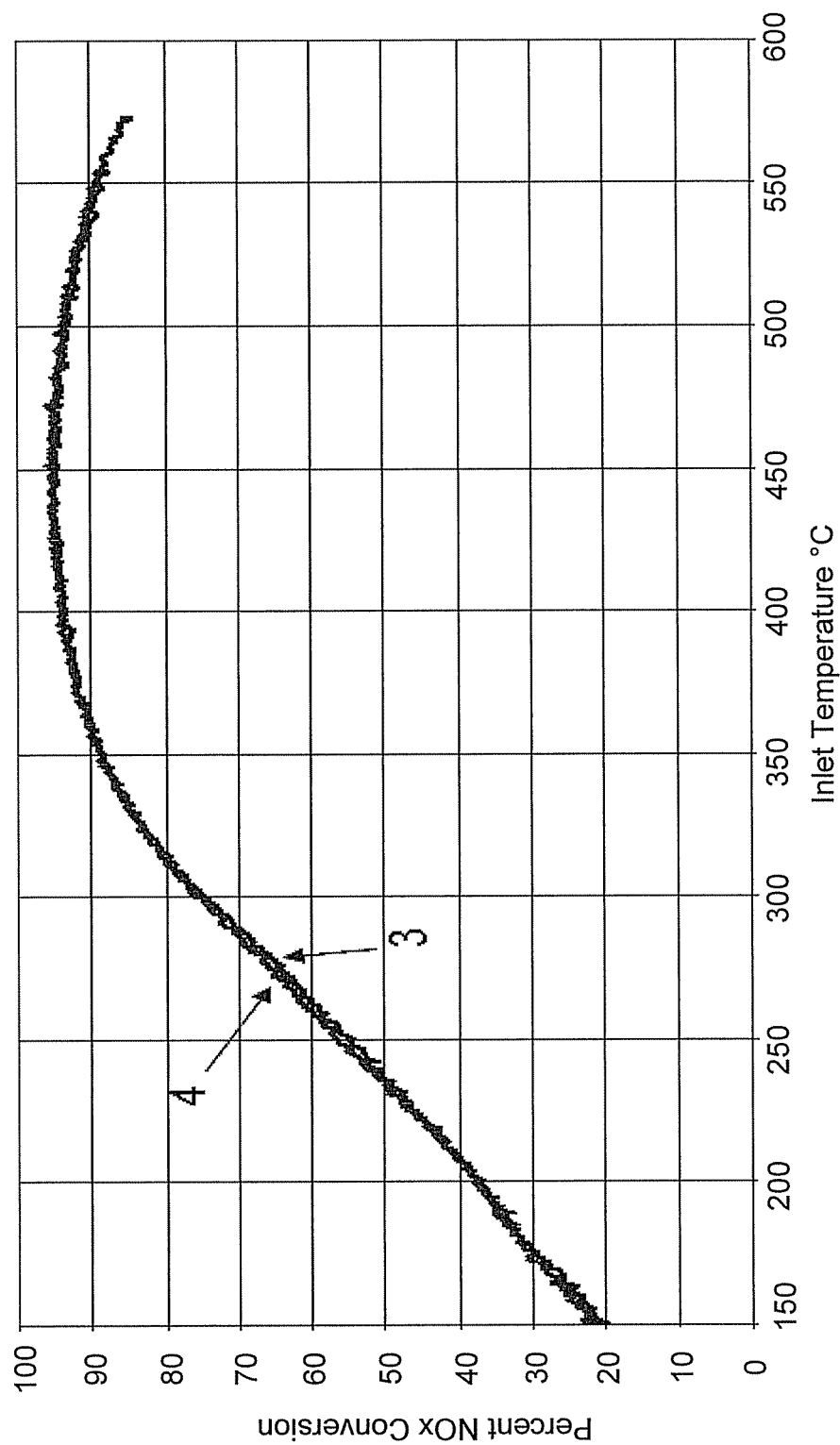
FIG. 1 is a graphic illustration comparing $NO_x$ gas conversion for Example 3 and comparative Example 4, as a function of inlet gas temperature.

Reference will now be made in detail to the embodiments of the disclosure, examples and aspects of which are illustrated in the accompanying figures.

In one illustrative embodiment, an extruded honeycomb catalyst body (the "catalyst body") is provided by mixing the metal exchanged zeolite with ceria-zirconia (Ce:Zr oxide) and a binder such as silicone and an organic binder such as methocel. The mixed composition can be extruded to form cellular bodies, such as having honeycomb structures, which can be referred to as green bodies, that are then fired to create the catalyst body. In some embodiments, the catalyst body is especially suited in applications for treating engine exhaust streams such as diesel and lean burning engine exhaust containing $NO_x$, HC and ammonia gas.

The Ce:Zr oxide and zeolite are stable at automobile exhaust temperatures, exhibit selective catalytic reduction ("SCR"), and can be used with urea injection. These cata- Comparative examples 2 and 4 had $WO_3$ impregnated into the shaped body after extrusion, while Comparative example 6 had $WO_3$ in the batch mixture that was extruded. All Examples were fired and then aged at 700 C for 6 hours. The extrusion mixture may contain other non-reactive fillers and binders (as superadditions).

TABLE 1

| Example | Wt % Components | CeO2:ZrO2 mole ratio | CeO2:ZrO2 Initial SA m²/g | WO3 wt % | Sample Wt (g) | % NOx Conversion 200 C. | 400 C. |
|---|---|---|---|---|---|---|---|
| 1 | 71 wt % Fe ZSM-5 Zeolite/29 wt % CeO2—ZrO2 | 1:0.7 | 81 | 0 | 5.89 | 40.6 | 92.5 |
| 2 | 71 wt % Fe ZSM-5 Zeolite/29 wt % CeO2—ZrO2 | 1:0.7 | 81 | 10.6 by Post extrusion impregnation | 5.77 | 19.3 | 77.1 |
| 3 | 71 wt % Fe ZSM-5 Zeolite/29 wt % CeO2—ZrO2 | 1:0.8 | 154 | 0 | 7.95 | 37.8 | 93.8 |
| 4 | 71 wt % Fe ZSM-5 Zeolite/29 wt % CeO2—ZrO2 | 1:0.8 | 154 | 10.6 by Post extrusion impregnation | 7.48 | 37.8 | 93.8 |
| 5 | 71 wt % Fe ZSM-5 Zeolite/29 wt % CeO2—ZrO2 | 1:0.8 | 154 | 0 | 6.53 | 60.6 | 96.7 |
| 6 | 71 wt % Fe ZSM-5 Zeolite/29 wt % CeO2—ZrO2 | 1:0.8 | 130 | 9.1 incorporated in CZO batch ition | 6.49 | 45.8 | 95.4 | lysts have $NH_3$ adsorption, $NO_x$ adsorption, and $NO_x$ oxidation sites for optimum $NO_x$ reduction performance. Adsorbed $NH_3$ on the surface interacts with adjacent adsorbed $NO_x$. The $NO_x$ is accordingly reduced to nitrogen and $H_2O$. The zeolite and the Ce:Zr oxide exhibit SCR activity of $NO_x$, however, in different temperature ranges. The zeolite (e.g. Fe-ZSM-5) converts a substantial percentage of NOx at a higher temperature region (e.g. above 400° C., or 500° C., or even 600° C.) while the Ce:Zr oxide convert a substantial percentage of NOx at a lower temperature region (e.g. below 350° C., or 300° C., or even 250° C.). In another aspect, the HC and ammonia gases are also catalytically reduced by the catalyst body.

Combining the metal zeolite with the Ce:Zr oxide widens the effective $NO_x$ conversion or reducing temperature window. For example, some embodiments have exhibited an operating temperature window of 200° C. to 600° C. for the effective reduction of $NO_x$ gas. In contrast, the lower temperature conversion window limit of HZSM-5 zeolite alone is approximately 325° C. Extending the lower window conversion temperature limit may be particularly advantageous for treating engine exhaust such as diesel exhaust gas.

We have found that effective $NO_x$ conversion can be obtained without the addition of tungsten or tungsten compounds (herein collectively referred to as tungsten unless otherwise noted) to a batch mixture or without adding tungsten to a shaped or shaped and fired body.

The disclosure may be further understood by reference to the following examples, which are intended to be merely illustrative of the compositions and methods for carrying out the invention.

Table 1 lists Examples 1-6, each of which was extruded into a honeycomb body and fired at 650 C for 5 hours.

FIG. 1 shows the $NO_x$ conversion performance of extruded honeycomb catalyst bodies Examples 3 and 4 made of 71 wt % Fe ZSM-5 zeolite and 29 wt % $CeO_2:ZrO_2$ with a Zr/Ce mole ratio of 0.8 shows essentially no improvement over Example 3 by the addition of tungsten ($WO_3$ impregnated into the extruded shaped body of Example 4 prior to firing).

Figure 2:
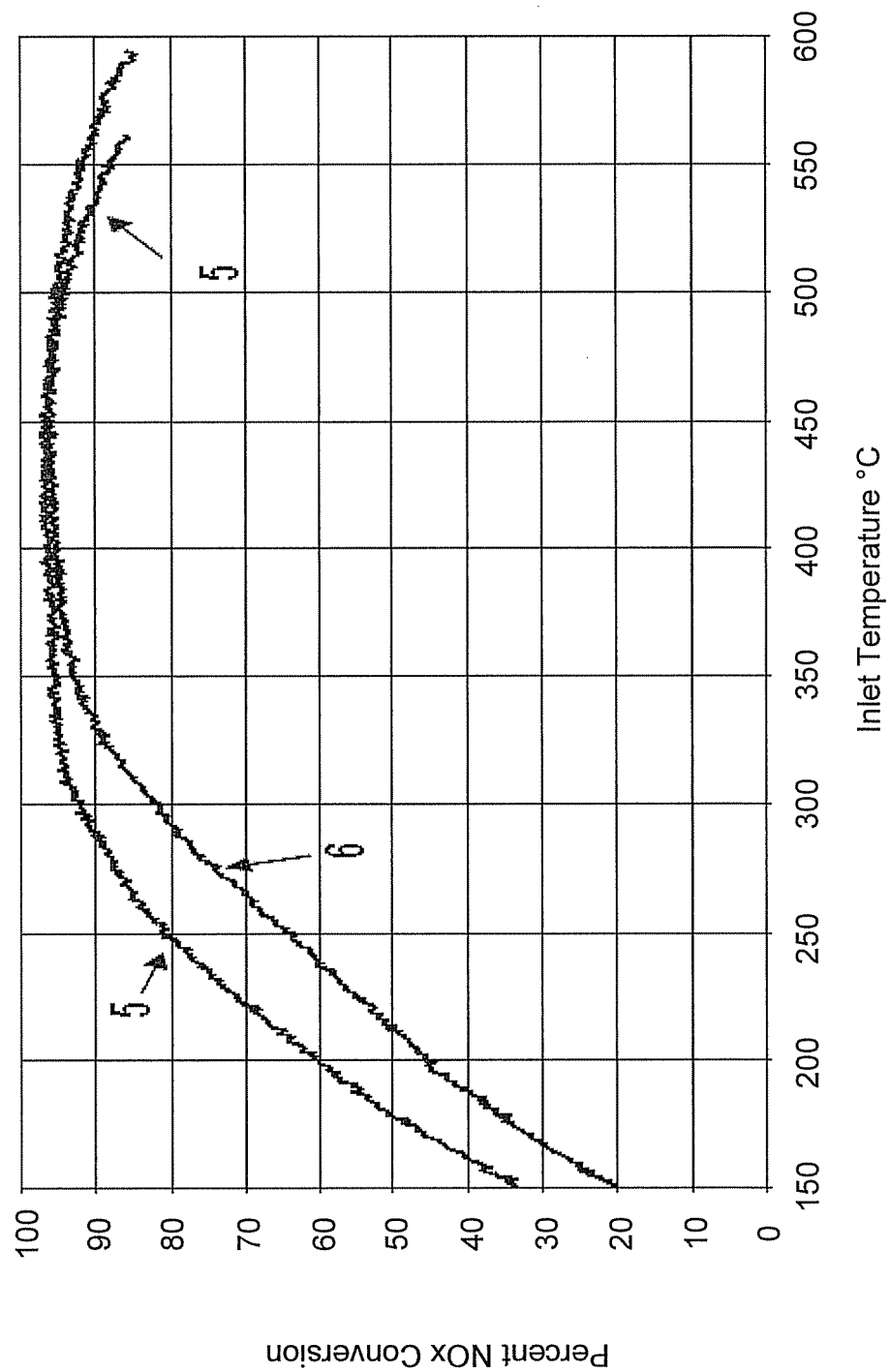
FIG. 2 is a graphic illustration comparing $NO_x$ gas conversion for Example 5 and comparative Example 6, as a function of inlet gas temperature.

FIG. 2 shows the $NO_x$ conversion performance of extruded honeycomb catalyst bodies Examples 5 and 6 made of 71 wt % Fe ZSM-5 zeolite and 29 wt % $CeO_2:ZrO_2$ with a Zr/Ce mole ratio of 0.8 shows the superior performance of Example 5 and shows that adding $WO_3$ into the mixture (extruded to form Example 6) is even less effective.

Figure 3:
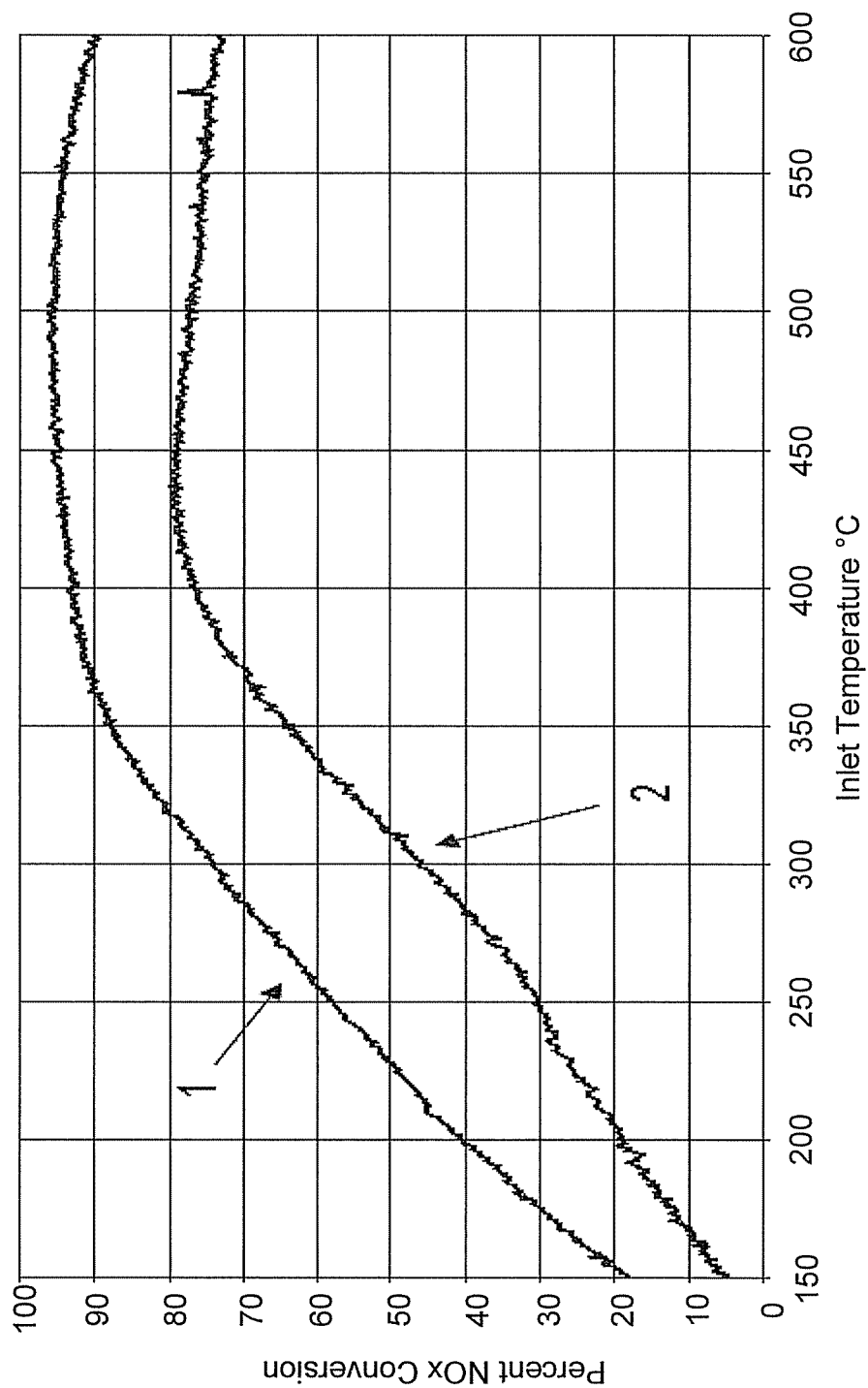
FIG. 3 is a graphic illustration comparing $NO_x$ gas conversion for Example 1 and comparative Example 2, as a function of inlet gas temperature.

FIG. 3 shows the $NO_x$ conversion performance of extruded honeycomb catalyst bodies Examples 1 and 2 made of 71 wt % Fe ZSM-5 zeolite and 29 wt % $CeO_2:ZrO_2$ with a Zr/Ce mole ratio of 0.7 shows even more significant performance improvement of Example 1 as compared to Example 2 with the addition of tungsten ($WO_3$ impregnated into the extruded shaped body of Example 2 prior to firing).

Exemplary zeolites include ZSM-5, Beta, Mordenite, Y-zeolite, Ultrastable-Y and aluminum phosphate zeolites, and mixtures thereof. These zeolites can be exchanged or impregnated readily with iron by one skilled in the art. One source of Fe-ZSM-5 zeolite is supplied by Zeolyst International of Valley Forge, Pa., USA. In some embodiments, the zeolite material can have a pore diameter ranging from 0.5 nm to 0.7 nm. In some embodiments, the zeolite has a Si/Al ratio of 15 to 100, or in other embodiments 15 to 50, or in other embodiments 15 to 30.

The firing procedure for firing the green bodies can be achieved with known ovens, such as periodic (or batch wise) ovens, or kilns, such as tunnel kilns that employ one or more conveyors. In some embodiments, the green bodies can be dried to remove water via microwave or conventional oven wherein the green body is heated to temperatures between 60 to 100° C. In some embodiments, the green structures are fired by exposing the green structures to a heated gaseous environment, such as air, wherein the air is heated to temperatures in the range of about 100° C.-1200° C., and in some of these embodiments between about 500° C.-900° C., with a residence time in that temperature range of a duration sufficient to complete firing of the body. The residence time can be about 1 to 48 hours, in some embodiments from 1 to 10 hours, and in some embodiments from 3 to 6 hours, and may depend, for example, on the type or source of components employed.

The catalyst bodies are produced by mixing batch materials, blending the mixture, forming a green body, and subsequently sintering or firing the green body to a hard porous structure. A batch mixture suitable for extrusion can be prepared by mixing the components described above with a suitable liquid vehicle. The vehicle may comprise water and extrusion aids necessary to give the batch plastic formability and sufficient green strength after forming to resist breakage prior to firing. Various lubricants, binders, surfactants, and viscosity modifiers can be added to the batch during the mixing step to provide viscosity control, plasticity, and strength prior to firing, to the fired structure.

The binder component holds the body together to achieve strong mechanical structure for the body. Suitable binder materials include silica or silica forming materials. Mixtures or combinations of binder materials may also be used. The binder is preferably selected from silicone binding agents such as silicone resins and/or emulsions. These can be provided as precursors, for example, silica precursors such as silicone resin, or colloidal silica are suitable. Preferably, the binder is incorporated in the form of a silicone resin or silicone emulsion. Silicone resins can be added to the mixture in the form of an aqueous emulsion, and are commercially available, such as Wacker AG SILRES® M 50 E (an emulsion of a methyl silicone resin with reported solids content of 52%-55%) or Wacker AG SILRES® M 97 E, both available from Wacker-Chemie GmbH of Munich, Germany. In some embodiments, the binder is incorporated in the batch mixtures such that the fired ceramic contains silica binder in an amount ranging from about 5% to about 30% by weight, preferably 15%-30%, and more preferably about 20%. The amounts of the binders are based on the expected weight after heat-treatment which will be the weight of the binder in the product body. For example, when silicone resins are used the weight of the binder in the product is the weight of silica added via the resins. During firing, silica, which may be provided in the form of one or more silica forming materials or in the form of silica itself, softens and propagates throughout the body. Upon cooling after firing, the silica hardens and serves as a binder for the other materials that make up the body.

The extrusion aids will normally comprise both binders and plasticizers/paste formers, as well as processing aids such as lubricants. The plasticizers/paste formers provide plasticity during forming, and some strength to the extruded body prior to firing. Organic pastes suitable for the purposes set forth herein include cellulose ether type materials and/or their derivatives. Sources of cellulose ethers and/or derivatives thereof include the Methocel™ line of cellulose ethers, from Dow Chemical Co., and mixtures thereof. Methylcellulose is an example of an organic paste forming agent suitable for use in formulating the extruded bodies of the present disclosure. The binder, organic paste and other processing aids are generally added as a super addition over the combined weight of the primary phase and secondary phase (based on expected weight after heat treatment). The super addition of organic paste is generally in the range of about 3%-8%, but more or less may be utilized. The organic paste or temporary binder material is substantially burned off during the subsequent firing of the honeycomb body. Water may be added to the batch components to achieve the necessary plasticity for handling and extrusion. Water-based binders can be used for ease of processing in this regard.

One method of forming the honeycomb structure is by extrusion through a forming die. A ram extruder, continuous auger, or twin screw extruder or other known extrusion apparatus can be used. The honeycomb body according to the present disclosure can have any convenient size and shape, for example, a right circular cylindrical shape structure. The honeycomb body can be extruded to form a matrix of walls wherein the primary phase material(s), secondary phase material(s) (if present) and permanent binder are generally homogenously distributed throughout the walls. The matrix of walls define channels extending through the honeycomb body. The honeycomb body can be further coated with a skin cement material at the outer periphery of the structure.

In some embodiments, the catalyst body can have an improved thermo-mechanical durability and improved thermal shock resistance due to a net balance or lowering of the coefficient of thermal expansion ("CTE") resulting from the mixture of zeolite with the first and second oxides. Thermal shock resistance depends on the CTE. The closer the CTE is to zero, the more thermally shock resistant is the material. Zeolites typically have low or negative CTEs, that is, a CTE of $-20 \times 10^{-7}/°$ C., or even lower over their useful stable temperature ranges. The Ce:Zr oxides typically have higher CTE than the zeolite. The catalyst body has a higher CTE than a body made from zeolite materials not combined with Ce:Zr oxides. The Ce:Zr oxide having a positive CTE balances the negative CTE of the zeolite. Thus, the present disclosure potentially provides thermally shock resistant zeolite-based honeycomb bodies and methods of making them.

Embodiments of the extruded and fired honeycomb bodies of the present disclosure can be particularly suited for use with engine exhaust systems as flow through substrates. In some embodiments, the provided body is also washcoated with a catalyst material. However, the honeycomb bodies of the present disclosure preferably exhibit high surface area and low thermal expansion, and in some embodiments reduce or eliminate the need for excessive high surface area washcoating.

In some embodiments, the honeycomb body is a flow through substrate.

It will be apparent to those skilled in the art that various modifications and variations can be made to the present disclosure without departing from the spirit and scope of the invention. Thus it is intended that the present invention cover the modifications and variations of this disclosure provided they come within the scope of the appended claims and their equivalents.

What is claimed:

1. A $NO_x$ reducing catalyst body comprising a plurality of walls comprised of an extruded and fired honeycomb body comprising a mixture of $CeO_2$—$ZrO_2$ and iron exchanged zeolite, the $CeO_2$—$ZrO_2$ and the iron-exchanged zeolite being distributed homogeneously throughout the walls,
wherein the catalyst body is free of tungsten, platinum, palladium, and rhodium,
wherein the catalyst body comprises 20 to 40 wt % $CeO_2$—$ZrO_2$, and wherein the ceria and zirconia are present with a zirconia/ceria mole ratio of less than or equal to 1.0, wherein the catalyst body is effective to reduce $NO_x$ by selective catalytic reduction in the presence of $NH_3$.

2. The $NO_x$ reducing catalyst body of claim 1 wherein the ceria and zirconia are present with a zirconia/ceria mole ratio of less than or equal to 0.9.

3. The $NO_x$ reducing catalyst body of claim 1 wherein the ceria and zirconia are present with a zirconia/ceria mole ratio of less than or equal to 0.8.

4. The $NO_x$ reducing catalyst body of claim 1 wherein the ceria and zirconia are present with a zirconia/ceria mole ratio of 0.7 to 1.0.

5. The $NO_x$ reducing catalyst body of claim 1 wherein the catalyst body is substantially free of tungsten oxides and vanadium oxides.

6. The $NO_x$ reducing catalyst body of claim 1 wherein the catalyst body comprises greater than or equal to 50 wt % of iron exchanged zeolite.

7. The $NO_x$ reducing catalyst body of claim 1 wherein the catalyst body reduces $NO_x$ gas by selective catalytic reduction in the presence of $NH_3$ by at least 20% at all temperatures from 150° C. to 600° C.

8. The $NO_x$ reducing catalyst body of claim 1 wherein the catalyst body reduces $NO_x$ gas by selective catalytic reduction in the presence of $NH_3$ by at least 30% at all temperatures from 200° C. to 600° C.

9. The $NO_x$ reducing catalyst body of claim 1 wherein the catalyst body reduces $NO_x$ gas by selective catalytic reduction in the presence of $NH_3$ by at least 40% at all temperatures from 200° C. to 600° C.

10. The $NO_x$ reducing catalyst body of claim 1 wherein the catalyst body reduces $NO_x$ gas by selective catalytic reduction in the presence of $NH_3$ by at least 50% at all temperatures from 200° C. to 600° C.

11. The $NO_x$ reducing catalyst body of claim 1 wherein the catalyst body reduces $NO_x$ gas by selective catalytic reduction in the presence of $NH_3$ by at least 60% at all temperatures from 200° C. to 600° C., and from greater than 80% to less than or equal to 95% at 550° C.

12. The $NO_x$ reducing catalyst body of claim 1, wherein the zeolite is selected from the group consisting of ZSM-5, beta-zeolites, mordenite, Y-zeolites, and mixtures thereof.

13. The $NO_x$ reducing catalyst body of claim 1 wherein the body has a plurality of walls defining a plurality of parallel channels.

14. The $NO_x$ reducing catalyst body of claim 13 wherein at least part of the body is honeycomb shaped.

15. The catalyst body of claim 1 wherein the catalyst body comprises 60 to 80 wt % zeolite.

16. The $NO_x$ reducing catalyst body of claim 1 wherein the zeolite has a Si/Al ratio of greater than 15.

17. The $NO_x$ reducing catalyst body of claim 1 wherein the zeolite has a Si/Al ratio of 15 to 100.

18. The $NO_x$ reducing catalyst body of claim 1 wherein the iron exchanged zeolite comprises iron exchanged ZSM-5.

19. A catalyst body comprising a plurality of walls consisting essentially of an extruded and fired honeycomb body comprising a mixture of $CeO_2$—$ZrO_2$ and an iron-exchanged zeolite, the $CeO_2$—$ZrO_2$ and iron-exchanged zeolite being distributed homogeneously throughout the walls,
wherein the ceria and zirconia are present with a zirconia/ceria mole ratio of less than or equal to 1.0,
wherein the catalyst body comprises 20 to 40 wt % $CeO_2$—$ZrO_2$,
wherein the catalyst body is free of tungsten, platinum, palladium, and rhodium, and
wherein the catalyst body is effective to reduce $NO_x$ gas by selective catalytic reduction in the presence of $NH_3$ by at least 30% at $NO_x$ gas temperatures of 200° C. to 600° C.

20. A method of using the $NO_x$ reducing catalyst body of claim 1 comprising contacting an engine exhaust stream containing $NO_x$ gas and $NH_3$ with the catalyst body of claim 1.

21. The method of using claim 19 wherein the temperature of the exhaust stream is less than 200° C. and the $NO_x$ gas is catalytically reduced by contact with the catalyst body of claim 1.

22. A method of manufacturing the catalyst body of claim 1 comprising:
extruding a mixture of an inorganic binder and oxide-based components into a shaped body, the oxide-based components being comprised of iron exchanged zeolite and $CeO_2$—$ZrO_2$, with a zirconia/ceria mole ratio of less than or equal to 1.0, the mixture being substantially free of tungsten; then firing the shaped body at a furnace temperature of at least 450° C. for at least 2 hours.

23. The method of claim 22 wherein the mixture comprises greater than or equal to 50 wt % zeolite and less than or equal to 50 wt % $CeO_2$—$ZrO_2$.

24. The method of claim 22 wherein the mixture comprises 60 to 80 wt % zeolite and 20 to 40 wt % $CeO_2$—$ZrO_2$.

* * * * *